June 2, 1964 G. J. WHYTE 3,135,949
DISK MEMORY DEVICE
Filed July 22, 1960 5 Sheets-Sheet 1

INVENTOR
Gordon J. Whyte

BY Strauch, Nolan & Neale
ATTORNEYS

June 2, 1964 G. J. WHYTE 3,135,949

DISK MEMORY DEVICE

Filed July 22, 1960 5 Sheets-Sheet 2

INVENTOR
Gordon J. Whyte

BY Strauch, Nolan & Neale

ATTORNEYS

June 2, 1964 G. J. WHYTE 3,135,949

DISK MEMORY DEVICE

Filed July 22, 1960 5 Sheets-Sheet 3

INVENTOR
Gordon J. Whyte

BY Strauch, Nolan & Neale
ATTORNEYS

June 2, 1964 G. J. WHYTE 3,135,949

DISK MEMORY DEVICE

Filed July 22, 1960 5 Sheets-Sheet 4

INVENTOR
Gordon J. Whyte

BY Strauch, Nolan & Neale
ATTORNEYS

June 2, 1964 G. J. WHYTE 3,135,949

DISK MEMORY DEVICE

Filed July 22, 1960 5 Sheets-Sheet 5

INVENTOR
Gordon J. Whyte

BY Strauch, Nolan & Neale
ATTORNEY 3,135,949
DISK MEMORY DEVICE

Gordon J. Whyte, Berkeley, Calif., assignor to SCM Corporation, a corporation of New York Filed July 22, 1960, Ser. No. 44,808
20 Claims. (Cl. 340—174.1)

The present invention relates to memory storage devices of the type having a rotating disk, and is particularly applicable to magnetic recording apparatus useful with electronic computers.

The conventional memory storage unit such as a magnetic drum represents a large portion of the actual component or hardware costs for computers, and the cost of such memories in the past has been too large for commercial use in small computing systems. As specialized electronic computing applications, such as office accounting and billing machines using electronic digital computing techniques, require relatively small or moderate memory capacities, there is accordingly a strong unfilled need and demand for a low cost memory unit having medium access time which will permit profitable commercial production of inexpensive computing systems.

A major object of the present invention is to provide a memory storage device which can be economically produced and which requires a minimum of precision manufacturing techniques.

A further object of the invention is to provide in such a device, a disk memory unit having bearing surfaces on the disk and on the head mounting plate so arranged that misalignment of shafts and shaft vibrations inherent with the use of inexpensive bearings do not interfere with satisfactory operation of the memory unit.

Still another object of the invention is to provide a rotating disk of the foregoing type which is driven through a flexible coupling unit and so mounted as to rotate in a fixed plane about an axis independent of the axis of rotation of the drive shaft, and which is further provided with means for laterally positioning the axis of rotation of the rotating disk member that permits swivel movement of the axis of rotation of the disk.

A further object of the invention is to provide a compact memory unit having a rotating disk mounted in a cavity within a closed compartment with the electro-magnetic transducers mounted on the compartment walls and with the plane of rotation of the disk determined by a surface on the compartment wall containing the transducer heads whereby precise tolerances and expensive components are not required.

A still further object resides in the provision of a graphite disk member which may be machined to provide a central bearing surface that is self-lubricating and highly wear-resistant, and to provide an outer parallel surface which is preferably coplanar that may be coated with a magnetic dispersion, operatively positioned with respect to electro-magnetic transducing heads mounted on the frame, such frame also serves as part of the thrust bearing for the disk.

Another object is to provide in a novel memory unit of the foregoing type wherein a shaft is journalled in bearings at opposite ends and the disk member having the magnetic coating is laterally positioned about a generally spherical collar located on the shaft intermediate of said bearings.

These and other objects of the invention will become more fully apparent from the claims, and from the specification when read in connection with the appended drawings wherein:

Figure 1:
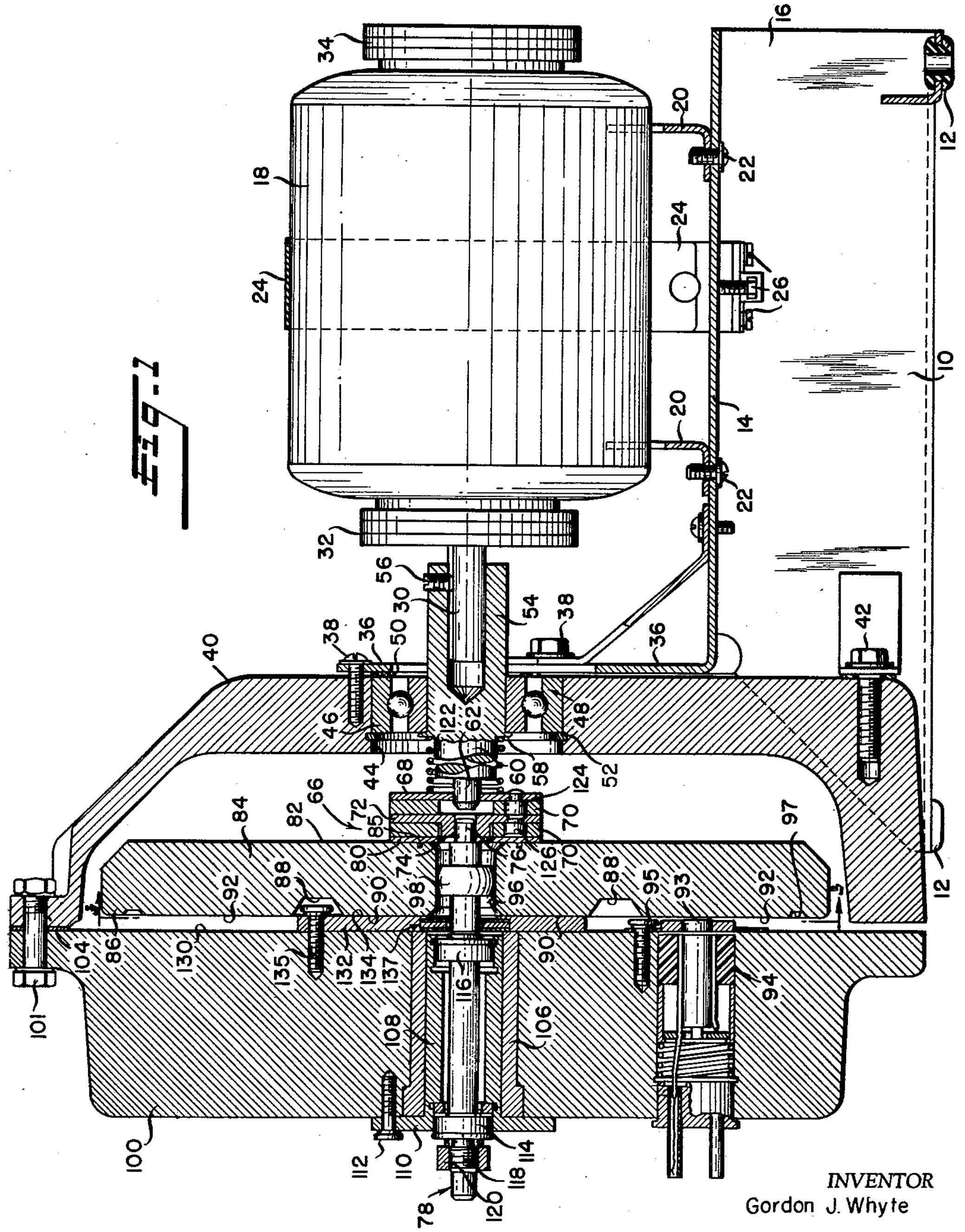
FIGURE 1 is a side elevation view in section of one embodiment incorporating the present invention.
Figure 2:
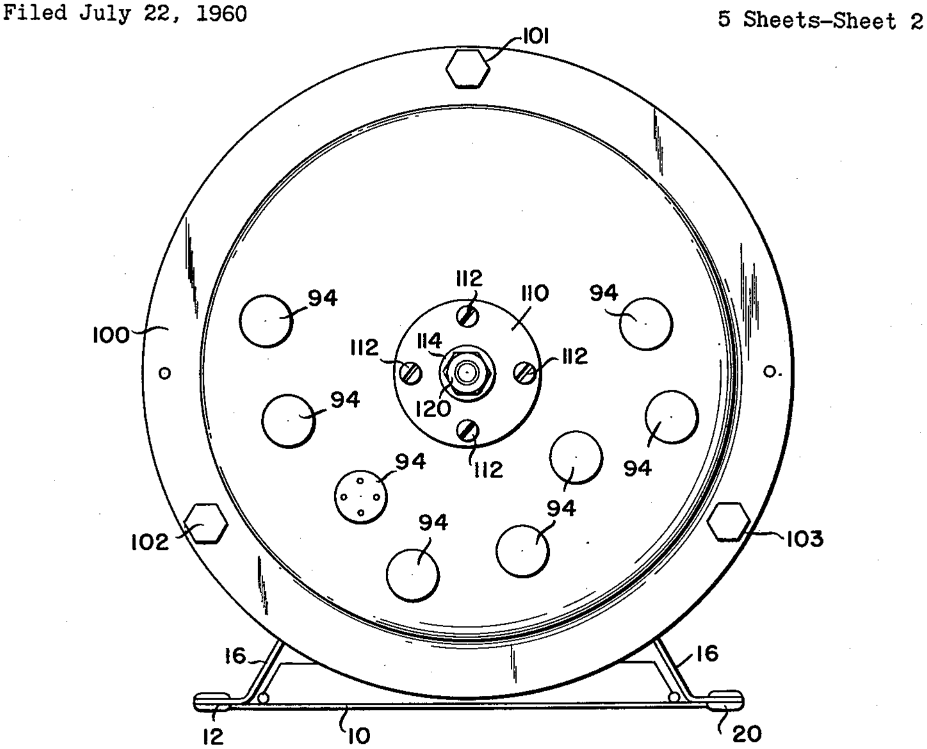
FIGURE 2 is a left hand elevation view of the embodiment shown in FIGURE 1.

Referring now to FIGURES 1 and 2, a typical structure embodying the present invention may comprise a frame having a lower member 10 with soft rubber grommet supports 12 and an upper member 14 joined together as a box by spaced side walls 16. Supported on upper member 14 is an electric motor 18 having a rating of approximately 0.1 hp. or smaller. Motor 18 is suitably secured in position as by brackets 20 and metal fasteners 22 and by band 24 and fasteners 26. The output or drive shaft 30 of motor 18 is journalled in motor bearing races 32 and 34.

Upper member 14 of the frame has a vertically extending portion 36 which is suitably apertured to receive fasteners 38 which are threadedly received in end bell 40. End bell 40 is further secured to the base with a pair of fasteners 42 (only one being shown in FIGURE 1) to thereby be rigidly secured to the frame.

End bell 40 is provided with a central bore having a cylindrical wall 44 into which the outer race 46 of a ball bearing assembly 48 is mounted and held in position by spacer 50 and lock ring 52. A shaft extension member 54, which fits inside ball bearing assembly 48, is provided with a bore in one end which fits over the end of motor shaft 30 and is secured to turn with shaft 30 as by set screw 56. Shaft extension member 54 is provided with a shoulder 58 on the side of ball bearing assembly 48 remote from motor 18 and cylindrical central portion 60 of reduced diameter. The end of central portion 60 contains a tongue 62 which serves to transmit driving torque to flexible coupling unit 66.

Flexible coupling unit 66 may be of the type which comprises an outer metal disk member 68 which is provided with a slot or groove that receives tongue 62, a pair of rubber spacers 70, a central metal disk member 72 having a hub 74 which fits loosely on the end portion 76 of head mounting plate shaft 78, and an inner metal disk member 80 which is pressed against the rear surface 82 of the main rotating disk member 84 by spring 122 to transmit torque to disk member 84. Disk member 80 may be provided with two or more pins 85 which fit into holes in disk member 84 to transmit rotational torque.

Main disk member 84 is preferably made of a hard, machinable material such as Purebon P33 as manufactured by the Pure Carbon Co., Inc. Such material comprises molded graphite along with a wear inhibiting agent which is machinable to provide a large, plane surface area on the front surface 86 of disk 84. The self-lubricating and wear resistant properties of graphite are reported in the literature to be provided in large part by adsorbed substances such as water, oxygen and nitrogen. Artificially added wear inhibiting agents such as water retaining compounds (copper sulfate); oxygenated compounds such as oxides of lead, molybdenum and tellurium; oxygen substitutes such as sulfur and its compounds and halides (cadmium iodide and barium fluoride); oily liquid lubricants containing hydroxyl groups (polyoxyalkylene diols); solid lubricants such as metallic lead and sulfides of molybdenum and titanium; and polytetrafluorethylene are all disclosed in published patents as providing improved wear properties where sliding surfaces are involved.

Front surface 86 is divided by a circular groove 88 to have an inner region 90 and an outer region 92. Both regions are easily made absolutely planar as by machining, grinding and lapping which is an important advantageous feature of the present invention as will be pointed out in greater detail below. Inner region 90 is used as a bearing surface for guiding the rotation of disk 84 in a plane whereby outer region 92, which is surface coated with a dispersion containing magnetizable particles, maintains a uniform gap spacing relative to the pole surface 93 of reading-writing electro-magnetic transducer head 94.

Outer region 92 of front surface 86 of disk 84 has a magnetizable surface which may be formed in manners such as by applying a metal etching primer and then applying as by spraying or brushing, a thin layer approximately 0.001 inch thick, of a magnetic dispersion such as that commercially available from Minnesota Mining and Manufacturing Company identified as magnetic dispersion RD 3010. In effect, the layer of magnetizable material at outer region 92 is a thin layer composed of particles of a magnetic material such as iron oxide, the particles being suspended substantially homogeneously as a dispersion in a shellac or paint.

The magnetizable surface of outer region 92 is substantially coplanar with the bearing surface at inner region 90; however, in practice, outer region 92 is undercut by a distance of approximately 0.001 inch. Then when the magnetizable material is added, the entire front surface 86 of disk 84 may be made coplanar, excepting of course for groove 88.

At the center of disk 84, a bore having wall 96 is provided to receive end 76 of head mounting plate shaft 78. Shaft 78 has a tapered collar 98 having its maximum diameter at about the mid-point of disk 84 and diminishing diameters as the edges of the collar are approached whereby disk member 84 is mounted for swivel movement about the axis of collar 98. From theoretical considerations, collar 98 should have a contour so that the thickness of the collar in any direction is equal to the diameter of the central bore in disk member 84. The simplest configuration is thus a sphere, but in practice other configurations may be used so long as collar 98 fits reasonably tightly at all angular deviations encountered during operation. The primary function of collar 98 is thus to determine the lateral positioning of the axis of rotation of disk 84, without interfering with the angular position of the axis of rotation relative to the axis of rotation of head mounting plate shaft 78.

Head mounting plate 100 is held to end bell 40 as with three machine screws 101, 102 and 103. Washer 104 separates slightly head plate 100 from end bell 40.

In head mounting plate 100, a plurality of electromagnetic reading and writing heads 94 are mounted around separate storage channels on the outer region 92 of disk member 84. The location of such heads 94 as diagrammatically illustrated in FIGURE 2 is determined by the logic used in the computing system. Each head 94 is secured in apertures in head mounting plate 100 as by screw fasteners 95 and the pole face 93 ground off or otherwise adjusted to provide an initial maximum clearance on the order of 0.001 inch.

In the center of head mounting plate 100, a suitable bore is provided to receive an outer sleeve 106 with a press fit. Inside outer sleeve 106 is a bearing retaining sleeve 108 which has an outer flange 110 suitably apertured to receive a plurality of circumferentially spaced fasteners 112 which hold sleeve 108 in correct position in head mounting plate 100.

Bearings 114 and 116 are mounted to bearing retaining sleeve 108 at opposite sides of head mounting plate 100 to be spaced apart a sufficient distance, such as 1½ inches, to provide a suitable fixed axis of rotation for shaft 78 journalled in bearings 114 and 116. Shaft 78 is threaded at portion 118 to receive nut 120 which is tightened against the edge of bearing 114.

Hub 74 on disk 72 of flexible coupling unit 66 is slotted to loosely fit over the tongue on end portion 76 of shaft 78 nearest motor 18, and coil spring 122 which is compressed between shoulder 58 of shaft extension member 54 and washer 68, presses the flexible coupling assembly 66 against disk member 72 to drive shaft 78 and against rear surface 82 of disk member 84 to assure engagement of pins 85 to drive disk member 84. Rivets 124 and 126 may be mounted between disks 68, 72 and the adjacent rubber spacers 70 to serve as the primary torque transmitting elements and prevent slippage of flexible coupling unit 66.

At a central region on surface 130 of head mounting plate 100 is a thrust bearing plate 132 of a material having a hard, wear-resistant surface 134 which is secured by three fasteners 135 to head mounting plate 100. At the center of plate 132, a stepped bore is provided to receive a compression washer 137 composed of a spacer sandwiched between two metal washers. When fasteners 135 are tightened, the center of plate 132 compresses washer 137 against sleeve 106, the purpose being to provide a rotary seal to prevent graphite wear particles from entering ball bearing 116.

A satisfactory material for thrust bearing plate 132 is low carbon steel with preferably a lapped hard chrome plate surface 134. As disk member 84 contains a substantial percentage of graphite which serves as a natural lubrication, no other lubrication is needed between surface 134 of plate 132 and surface 90 of disk member 84.

Figure 3:
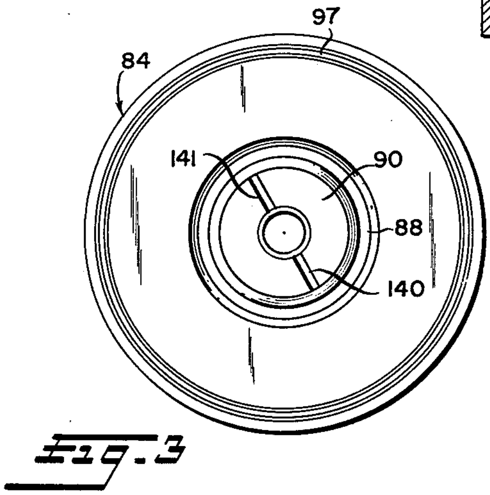
FIGURE 3 is a view of the rotating disk taken along line 3—3 of FIGURE 1.

As shown in FIGURE 3, the inner bearing surface region 90 on disk member 84 may contain radial slots 140 and 141 which are small grooves or depressions that serve to provide channels through which any loosened particles that appear on the bearing surfaces 90 and 134 are removed out of the bearing area to the periphery of the disk. While slots 140 and 141 are shown as lying along a diameter, they may be curved as a spiral or have other suitable configurations.

Instead of disk member 84 being made of principally graphite and plate 132 of steel, the materials for the parts in the regions serving as the thrust bearing may be reversed to still provide the self-lubricated, low friction thrust bearing that determines the plane of rotation for disk member 84. However, an important advantage in construction is obtained by making disk member 84 out of machinable graphite in that the central region 90 serving as the bearing surface and the outer region 92 where the magnetizable material is applied may be made perfectly planar. Then, plate 132 may be mounted on surface 130 of head mounting plate 100 to provide a predetermined gap or space between the magnetizable surface region 92 of disk member 84 and face 130 of head mounting plate 100.

Figures 4, 5, 7:
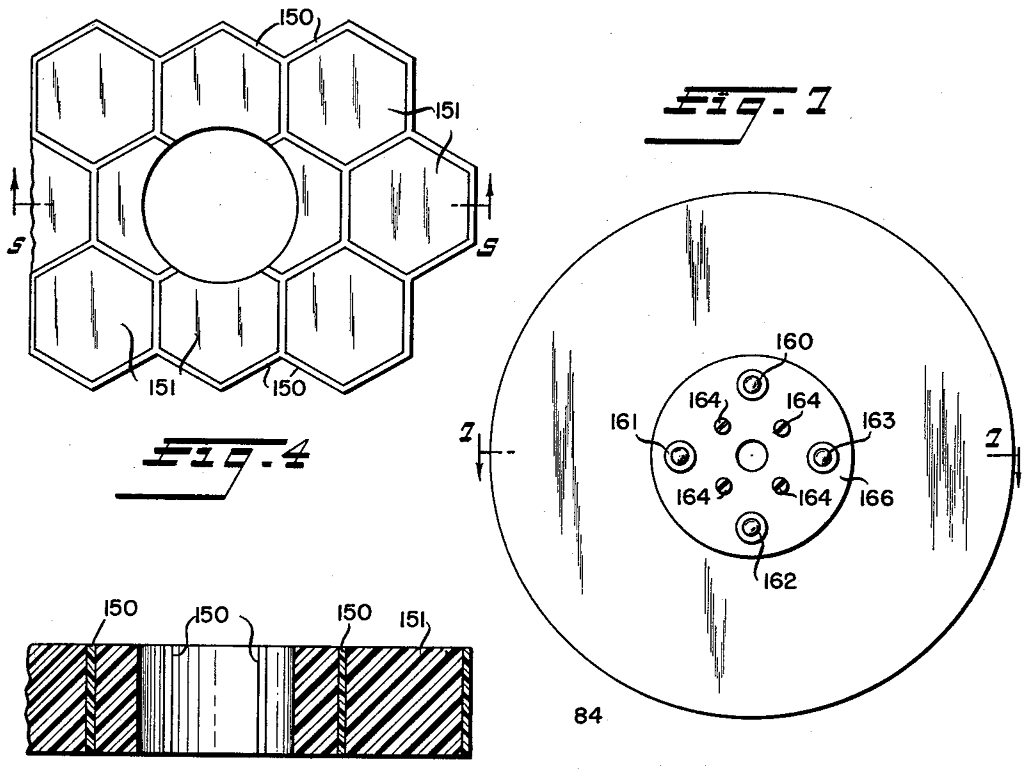
FIGURE 4 is a view of an alternative form of bearing surface which has properties of being hard, wear-resistant and providing self-lubrication.
FIGURE 5 is an elevation view in section taken along line 5—5 of FIGURE 4.
FIGURE 7 is a view similar to FIGURE 3 of a modified form of the rotating disk having a ball bearing assembly which determines the axis of rotation of the disk member by rolling on a hard, wear-resistant surface of the transducer element mounting plate.

Instead thrust bearing surfaces 90, 134, polytetrafluoroethylene, (T.F.E.) commercially available as Teflon, may also be used. However, as this material has a tendency to cold flow, it is preferably used in a porous matrix. For example, as shown in FIGURES 4 and 5, the matrix may comprise a honeycomb configuration of walls 150 of suitable non-metallic, fibrous material such as fiberglass or mica, with rods 151 of the Teflon material mounted rigidly in the matrix walls 150 so that the ends of the Teflon rods bear against the other surface of the thrust bearing. In this embodiment, the rotating disk member 84 of FIGURE 1 may be made of any suitable non-warping, non-magnetic material and plate 132 formed of the porous Teflon matrix in which the length of the Teflon rods correspond to the thickness of plate 132 as viewed in FIGURE 1.

Other types of thrust bearing surfaces having low friction coefficients may also be used in the disk memory unit of the present invention. Film lubricants are commercially available which bond to a surface and possess excellent initial lubricity which increases upon use due to the sliding action of the mating bearing member on the exposed surface of the film lubricant. Such film lubricants having permanent or long life effectiveness when dried or otherwise bonded to the surface to be lubricated make possible the use of a large variety of materials for the thrust bearing surface. Also, molybdenum disulphite may be used as a lubricant.

Other satisfactory materials are also available commercially. For example, a material known as DU and manufactured by Glacier Metal Company Ltd. of England, consists of a tin plated steel backing on which is sintered a thin lining of spherical bronze impregnated with a mixture of T.F.E. fluorocarbon plastic and lead and having a thin surface layer over the top of the bronze spheres of the same T.F.E.-lead mixture. The T.F.E.-lead impregnated bronze comprises two completely interlocked sponge-like networks—one of the bronze and the other, the T.F.E.-lead mixture. This composite material offers the advantages of each of the individual component materials.

Figure 6:
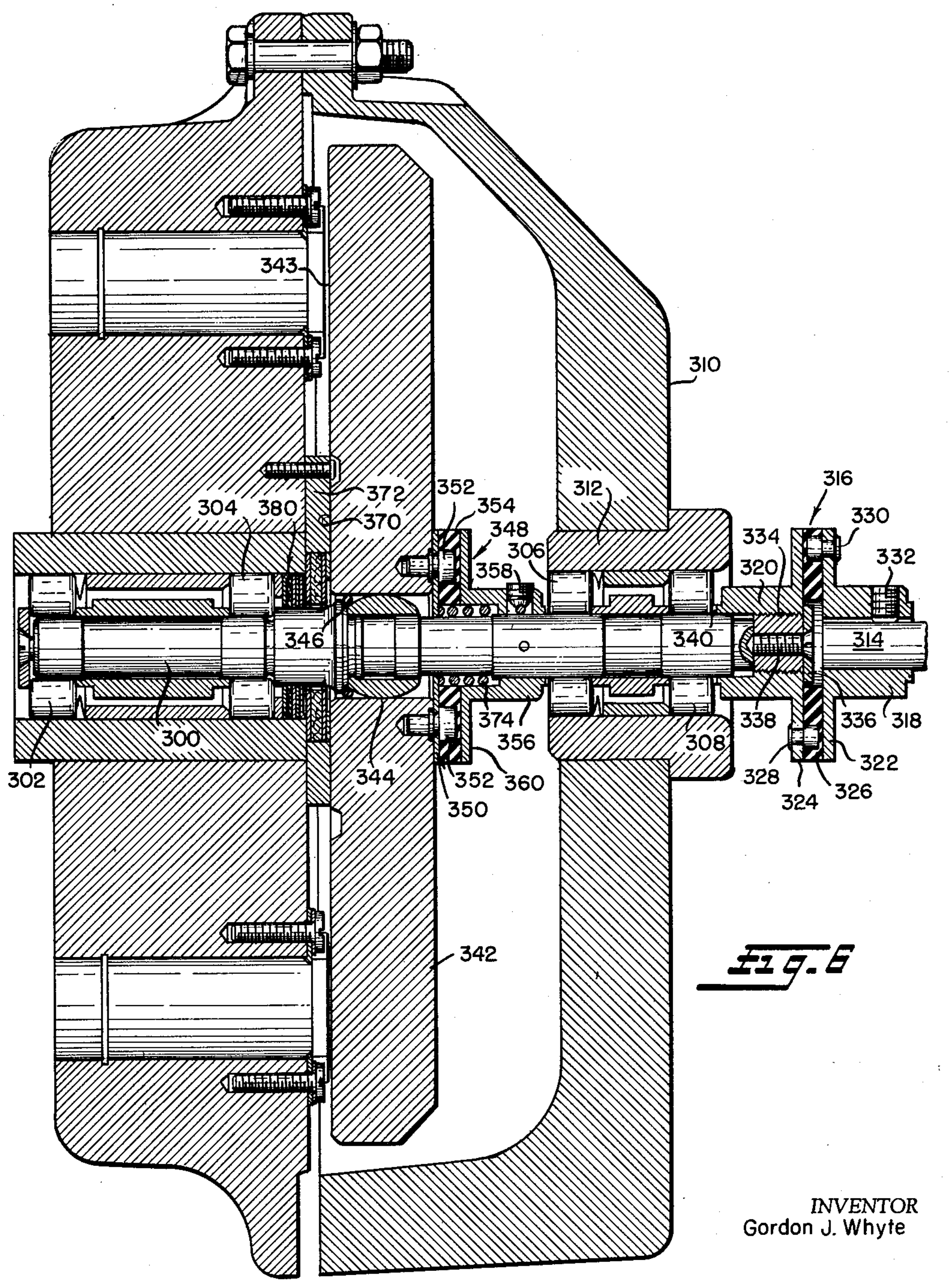
FIGURE 6 is a side elevation view in section similar to FIGURE 1 of a modification of the embodiment shown in FIGURES 1–3.

In the embodiment shown in FIGURE 6, the construction is basically similar to that illustrated in FIGURES 1–3 excepting for the head mounting plate shaft 300. In FIGURE 6, shaft 300 is journalled at its outer end in bearings 302 and 304 and at its inner end by bearings 306 and 308 which are mounted in end bell 310 by sleeve 312. Head plate mounting shaft 300 is thus journalled at both ends rather than merely at one end as in the embodiment previously described.

Driving torque is supplied from motor shaft 314 of a motor (not shown) which is mounted on the frame, and coupled to head mounting plate shaft 300 as by means of flexible coupling assembly 316. Assembly 316 may be of any conventional construction and as here illustrated comprises a pair of coupling members 318 and 320 having respective flanges 322 and 324 which are separated by a rubber disk 326 and coupled to turn together as by two pairs of studs 328 and 330. Coupling member 318 is secured to the end of motor shaft 314 as by set screw 332. Coupling member 320 is secured to the threaded end portion 334 of head plate mounting shaft 300 and locked in position as by means of washer 336 and screw 338. One or more shims 340 are provided so that coupling member 320 may be drawn tight against bearing 308.

The main rotating disk member 342 having the magnetizable surface 343 and which may be identical to main disk member 84 in the embodiment of FIGURES 1–3, is mounted on a generally spherical collar 344 which fits tightly on or is otherwise made integral with shaft 300. O-ring 346 is preferably provided to serve as a seal.

Rotational torque is supplied to disk member 342 as by means of a flexible coupling assembly 348 composed of a metal disk 350 which is apertured to receive studs 352, the heads of which are embedded in a rubber layer 354. A coupling sleeve 356 is secured to be driven by shaft 300 as by means of set screw 358. Flange 360 is secured to rubber layer 354 as by means of studs (not shown).

Main disk member 342 is urged against surface 370 of bearing plate 372 as by spring 374 which is concentric with shaft 300 and fits inside one end of coupling sleeve 356 and bears against washer 350. Thus, disk member 342 is given a rotational or turning movement generally about the axis of head mounting plate shaft 300, but the precise angle of the rotational axis for disk member 342 is determined solely by the planes of surface 370 and of its abutting surface in view of the resilience of flexible coupling assembly 348 and collar 344 as in the case of the other embodiments described herein.

The remaining parts of the embodiment shown in FIGURE 4 are similar to the embodiment of FIGURES 1–3 and therefore, further detailed description is believed unnecessary. The additional shaft seal 380, which comprises a layer of felt between two metal washers, located between bearing plate 372 and bearing 304 serves to prevent any abrasive particles from getting into the bearings.

The two pairs of bearings 302, 304 and 306, 308 on opposite ends of head mounting plate shaft 300 provide a better fix for the position of the turning axis for the disk member having the magnetic coating than does the cantilever shaft mounting bearing arrangement as in the embodiment shown in FIGURES 1–3. This means that the center of rotation about which disk member 342 rotates is more rigidly controlled as to lateral displacement than is the center of rotation of disk member 84. This is important in connection with magnetic storage units because slight changes or variations of a circular recording channel or the position of the center of such channels on the disk surface under the transducing heads not only reduces signal strength but also affects timing due to changes in the arc length and/or angles between two transducing heads which are aligned with the same recording channel. Very slight deviations of the center of a disk memory unit thus may materially affect reliable operation of such a computing system because the several transducing heads are precisely located relative to the center of rotation for the rotating disk, gating signals are precisely timed by the speed of rotation of the disk, and thus a change in the position of the center of rotation changes the central angle between two transducer heads and hence changes the time for a spot on the recording channel to pass from one head to the other.

Figure 8:
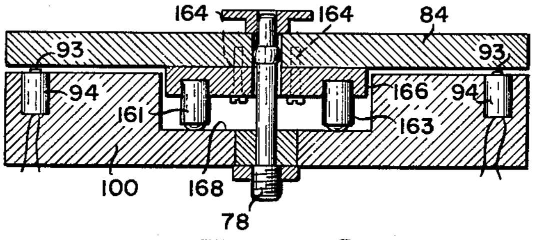
FIGURE 8 is a sectional view in elevation taken along line 8—8 of FIGURE 7 and showing in addition part of the head mounting plate.

As a further alternative, the arrangement shown in FIGURES 7 and 8 may be used wherein the central portion of disk member 84 is provided with four ball bearings 160, 161, 162 and 163 spaced about the axis of head mounting plate shaft 78 and in housings secured to bearing plate 166. Parts similar to those described in connection with FIGURE 1 are given identical reference numerals. Bearing plate 166 is, in turn, suitably secured to turn with disk member 84 as with screws 164. Head mounting plate 100 has a hard, wear-resistant surface 168 at an inner region. Surface 168 together with ball bearings 160—163 provide a thrust bearing similar to that provided by the sliding surfaces described in connection with the embodiments shown in FIGURES 1–4, but less desirable in the respect to cost of the bearings and of their assembly in bearing plate 166. In this embodiment, the ends of the balls in bearings 160—163 must be precisely positioned in plate 166 since improper extension of any one bearing will result in an undesired wobble or swivel of disk member 84.

Figure 9:
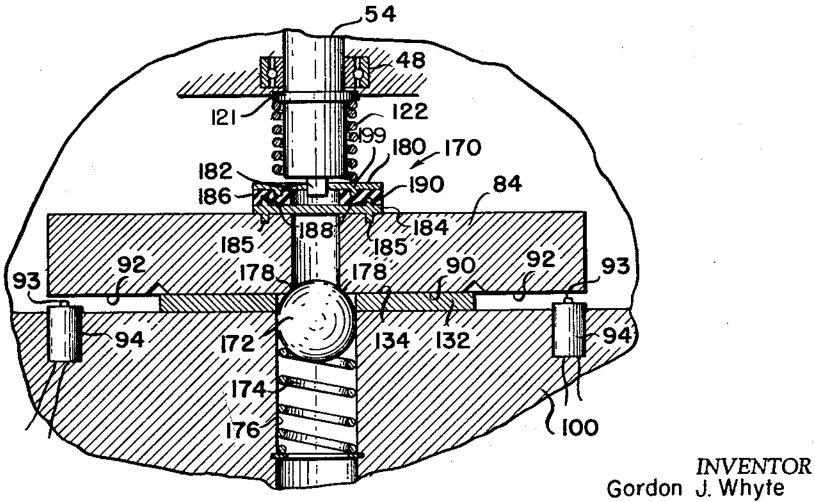
FIGURE 9 is a partial elevation view in section of a further embodiment of the present invention in which a pilot ball is used for controlling the lateral position of the rotating disk member.

In FIGURE 9, a further embodiment of my invention is shown wherein the head mounting plate shaft 78 of FIGURE 1 which has the primary function of laterally positioning disk member 84 relative to head mounting plate 100 has been replaced by a pilot ball 172. In this embodiment, the motor has not been shown but only shaft extension member 54 which is mounted in bearing 48 and which drives disk 84 through flexible coupling 170 are illustrated. Disk member 84 may be made of a non-magnetic material, as in the case of the embodiment described in connection with FIGURE 1, and has a plane surface on one side divided into two regions. Inner region 90 serves as a bearing surface and outer region 92 is coated with a magnetic substance, all as explained above. The outer region 92 containing the magnetizable substance is of an annular shape and concentric with the inner region 90, and both regions lie in the same plane.

Head mounting plate 100 is provided with thrust bearing plate 132 which has a bearing surface 134 that engages surface 90 on disk member 84.

The flexible coupling unit 170 may comprise an upper plate 180 which has a slot adapted to receive tongue 182 on the end of drive shaft 54. The lower member 184 of flexible coupling unit 170 has two or more pins 185 which engage holes in disk member 84. The central coupling member 186 may be a rubber disk whereby pins 188 on upper disk 180 will engage only the rubber and the pins 199 on the lower disk member 184 similarly engage holes in the opposite side of rubber disk 186. The important kinematic property of this coupling is that it transmits torque but does not rigidly fix the plane of disk member 84 with respect to the axis of drive shaft 54. Thus, the disk member 84 is permitted to rotate about an axis which may be slightly inclined to the axis of drive shaft 54, and which lies perpendicular to the plane of bearing surfaces 90 and 134.

Flange 121 is provided on shaft extension member 54 to serve as one support surface for spring 122. Spring 122 is a compression spring abutting also against disk 180 to hold pins 185 of the lower member 184 of flexible coupling unit 170 into the holes provided in disk member 84.

In head mounting plate 100, a central bore having walls 176 is provided which is in substantial axial alignment with shaft 54. Pilot ball 172 is inserted into the central bore and resiliently held in position as by spring 174 against an aligned central bore in disk member 84. The edges of the central bore of disk member 84 have chamfered surfaces 178 which serve as a partial socket for pilot ball 172 so that disk 84 does not move laterally while rotating. Disk member 84 thus pivots about pilot ball 172 while rotating and pilot ball 172 thereby accurately and precisely fixes the lateral position of the axis of rotation of the disk member 84. Because of the spherical shape of pilot ball 172, it offers no restraint to the orientation of axis of rotation of disk member 84 determined by the thrust bearing surfaces 90 and 134.

One or more electro-magnetic heads 94 are mounted in head mounting plate 100 with the pole tips 93 lying in a plane which is parallel to the plane of the thrust bearing defined by surfaces 134 and 90 and spaced approximately 0.001 inch from the magnetizable surface on region 92 of disk member 84. As is well known, this spacing is critical since the signal strength varies approximately as a function of the spacing between the magnetic recording surface 92 and the pole surface 93 of the transducer head 94. Where more than one transducer head is operatively associated with a particular recording track, the angular spacing between the heads must be carefully controlled for establishing a particular timing relation between the two heads. If there is lateral deviation of the axis of rotation for the recording track, this produces an apparent change in the angle between the transducing heads relative to the axis of rotation of the disk to thereby change the length of the arc path between the two heads. With a constant rotational speed, the arc length is directly proportional to the timing. Thus, in this embodiment as well as in the embodiments shown in FIGURES 1 through 8, the axis of rotation is determined by thrust bearing surfaces 90 and 134; lateral positioning of disk member 84 is determined by a separate means, which in this embodiment is pilot ball 172. By use of the flexible coupling unit 170, bearing 48 for drive shaft 54 need not be a high precision grade, as slight misalignment of drive shaft 54 with the axis of rotation of disk member 84 is not objectionable.

The magnetizable data storage tracks of outer disk region 92 are sufficiently wide to provide a lateral margin of operation for the transducer heads greater than the maximum lateral variations of disk position permitted by the disk bearing utilized.

Figure 10:
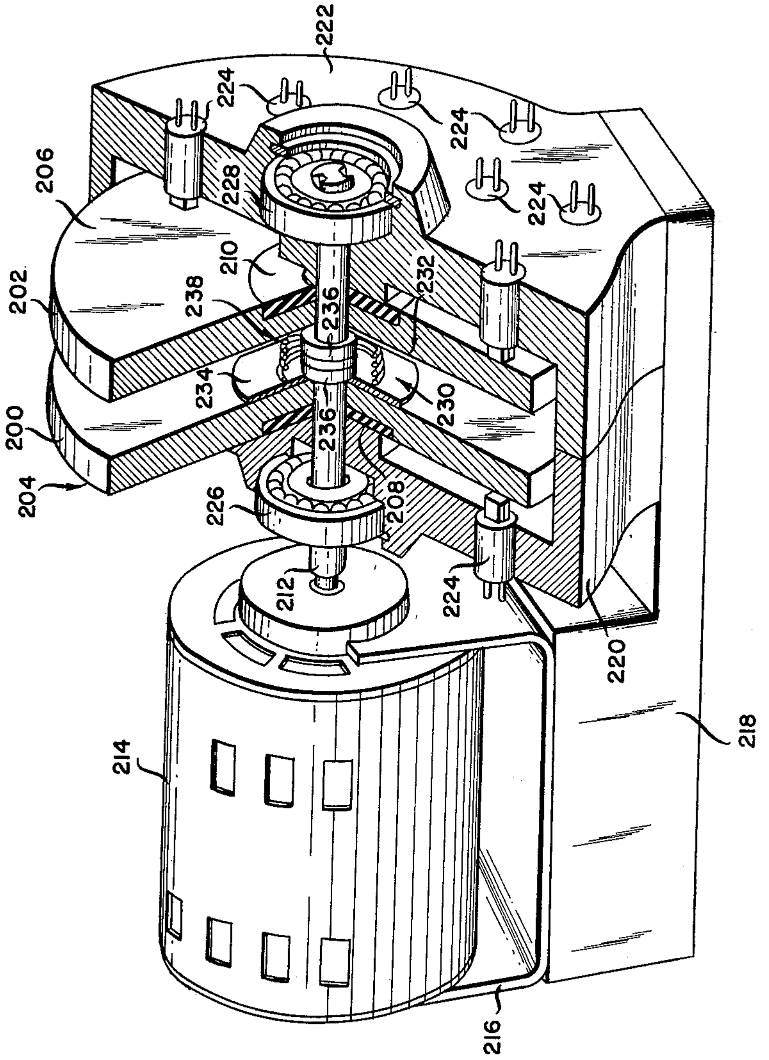
FIGURE 10 is a pictorial view, in partial section, of a further device embodying the present invention and having two rotating disk elements.

In the embodiment shown in FIGURE 10, a pair of disk members 200 and 202 are provided each having outer regions 204 and 206 respectively, which are coated with a magnetizable substance, and inner regions 208 and 210 respectively which serve as thrust bearing surfaces for guiding the respective disk members about their axes of rotation independently of the axis of rotation of shaft 212 driven by motor 214 and independently of one another. Motor 214 is mounted in U-shaped bracket 216 which in turn, is supported on base 218. Head mounting plates 220 and 222 are provided to carry the fixed electro-magnetic transducer heads 224 which are in operative alignment with the magnetizable material on the outer regions 204 and 206 of disk members 200 and 202 respectively. Bearings 226 and 228 are mounted in head mounting plates 220 and 222 respectively to mount drive shaft 212 for rotation about the approximate centers of disk members 200 and 202.

Disk members 200 and 202 fit loosely on drive shaft 212. Torque for driving disk members 200 and 202 is supplied through a pair of flexible coupling units 230 and 232 respectively. Each flexible coupling unit comprises a flange 234 which is secured as by adhesive to the surface of disk member opposite the surface having the magnetizable material, a collar 236 which is secured to drive shaft 212 in any suitable manner such as by use of a set screw (not shown) and resilient bellows type diaphragm 238. Diaphragm 238 permits swivel movement of disk members 200 and 202 relative to the axis of rotation of drive shaft 212 and serves as the means for controlling the lateral position of the axis of rotation of disk members 200 and 202. By this construction, the axis of rotation of disk members 200 and 202 is determined solely by the thrust bearing surfaces 208 210 respectively, and the resilient diaphragms 238 provide a spring force which urges the respective disk members 200 and 202 in opposite directions against their respective thrust bearings.

While the embodiments described above have electro-magnetic transducer heads and storage medium composed of magnetizable material, the invention is not limited to this single type of recording system, but may be used with other types of systems utilizing, for example, polarizable, spin echo or other storage media along with appropriate sensing or transducing elements adapted for operation with the particular storage medium use. The characteristic features of the present invention such as the novel bearing surface which is coplanar with the recording surface for determining the axis of rotation for the disk member independently of the axis of rotation of the drive shaft, the independent means for determining the lateral positioning of the axis of rotation of the disk member and the use of a graphite or other self-lubricating bearing coating with wear-resistant properties all result in an improved disk memory unit which may be manufactured much more economically and at a lower cost than prior memory units.

The two bearing surfaces which determine the axis of rotation of disk member 84 need to be accurately machined only with respect to the reference plane of the gap. The accuracies of these dimensions involve only shape tolerances and the dimensional tolerances which determine the relative positions of the head mounting plate parts to the motor frame parts may all be relatively large. This accounts in large part for the reduced cost of the disk memory unit of the present invention as compared with other types of memory units that are sufficiently reliable to be placed in commercial use.

In tests of the foregoing described memory units using a thrust bearing surface of graphite rubbing on a hard chrome plated lapped surface, measurements show that with a 3600 r.p.m. disk speed, the life expectancy of the bearing surfaces is several thousand hours, notwithstanding the very limited amount of wear that can be tolerated. For example, the core pole surfaces may be spaced about 0.001 of an inch from the recording surface on the pole tips, and operation in excess of 2000 hours was achieved before the pole tip to disk surface spacing become reduced to an inoperative amount.

In embodiments having a disk with a diameter of about 9 inches, thirteen separate tracks having one-quarter inch radial separation may be used with a total storage capacity of over 15,000 binary digits. Where two disks are used, the total capacity is obviously in excess of 30,000 binary digits.

All of the forms of the thrust bearing between the rotating disk and head mounting plate for the present invention may be characterized as having actual rubbing or sliding of surfaces, since even the embodiment described in connection with FIGURES 6 and 7 contain rolling balls which rub or slide against the walls of the socket surfaces in which the balls are mounted. These are to be distinguished from the floating type bearings used in the prior air-floating disk memory units, such as that shown in the January 1958 issue of Computers and Automation at page 21, which requires expensive and complex hardware for assembly and operation.

The disk memory unit of the present invention thus, because of its low cost, makes possible the manufacture of small, special purpose electronic computing systems for applications for which prior electronic computing techniques were not economically feasible. However, it is also applicable in multiple units to large prior computing and data processing systems.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination: a frame, a shaft mounted for rotation on said frame; a plurality of transducer devices mounted to said frame and having sensing portions thereof lying in a plane substantially normal to the axis of said shaft; a disk mounted for rotation relative to said frame and having a plane surface substantially normal to its axis of rotation, said surface being part of a storage medium for a memory unit and in operative relation to said transducer devices; and means connecting said disk to be driven by said rotating shaft, the axis of rotation of said disk being determined independently of said shaft by central thrust bearing regions of substantial area on said frame and said disk, said areas being in mutual physical rubbing engagement so as to maintain substantially uniform spacing between said heads and said storage medium surface of magnetizable material.

2. In combination: a frame, a shaft mounted for rotation on said frame; a plurality of transducer devices mounted to said frame and having sensing portions thereof lying in a plane substantially normal to the axis of said shaft; a disk mounted for rotation relative to said frame and having a plane surface substantially normal to its axis of rotation, said surface being part of a storage medium for a memory unit and in operative relation to said transducer devices; means connecting said disk to be driven by said rotating shaft, the axis of rotation of said disk being determined independently of said shaft by central thrust bearing regions of substantial area on said frame and said disk, said areas being in mutual physical engagement so as to maintain substantially uniform spacing between said heads and said storage medium surface of magnetizable material; and means supported by said frame for determining the lateral position of the disk in a plane perpendicular to the axis of disk rotation independently of said central bearing regions.

3. A disk memory unit comprising: a frame, a fractional horsepower motor mounted at one end of said frame; said motor having a drive shaft extending toward the other end of said frame; said other end of said frame having a transducer mounting plate facing said drive shaft, with said plate containing a bearing surface; a plurality of transducer devices mounted in said mounting plate; a disk mounted for rotation between said mounting plate and said motor with a portion thereof in operative relationship to said transducer devices; means coupling said disk to said drive shaft to cause rotation of said disk; said disk being resiliently held against the bearing surface on said transducer mounting plate to determine the axis of rotation for said disk independently of the axis of rotation of said drive shaft; and means independent of said drive shaft and of said mounting plate bearing surface for laterally positioning the axis of rotation of said disk.

4. A disk memory unit comprising: a frame; a drive shaft mounted on said frame for rotational movement; a plurality of transducer elements mounted to said frame having sensing portions lying in a plane substantially perpendicular to the axis of rotation of said drive shaft; a disk mounted for rotation relative to said frame having a plane bearing surface and a surface on a portion of said disk serving as a storage medium both perpendicular to the axis of rotation of said disk, said storage medium being in operative relation to said transducer elements; flexible coupling means for connecting said disk to said drive shaft; a bearing surface on said frame facing the bearing surface on said disk; spring means for urging said bearing surfaces together with sufficient force to maintain rotation of said disk in a plane; and means positioned by said frame for laterally positioning said disk in a plane perpendicular to the disk axis of rotation independently of the drive shaft.

5. A disk memory unit comprising: a frame; a drive shaft mounted on said frame for rotational movement; a plurality of transducer elements mounted to said frame having sensing portions lying in a plane substantially perpendicular to the axis of rotation of said drive shaft; a disk containing a chamfer concentric about the axis of rotation of said disk; and the means for laterally positioning the disk comprises a pilot ball mounted on said frame in substantial axial alignment with said drive shaft and means for resiliently urging said ball into said chamfer, said disk being mounted for rotation relative to said frame having a plane bearing surface and a surface on a portion of said disk serving as a storage medium both perpendicular to the axis of rotation of said disk, said storage medium being in operative relation to said transducer elements; flexible coupling means for connecting said disk to said drive shaft; a bearing surface on said frame facing the bearing surface on said disk; spring means for urging said bearing surfaces together with sufficient force to maintain rotation of said disk in a plane; and means positioned by said frame for laterally positioning said disk in a plane perpendicular to the disk axis of rotation independently of the drive shaft.

6. The disk memory unit as defined in claim 4 wherein the disk contains a central bore and the means for laterally positioning the disk comprises a positioning shaft supported by said frame in substantial axial alignment with said drive shaft and extending into the central bore in said disk; said positioning shaft having a rounded collar fitting snugly in said disk bore and positioned substantially centrally of the disk to permit relative motion between the collar surface and the bore surface, providing swivel movement of the disk relative to the axes of the drive shaft and of the positioning shaft.

7. A memory unit comprising in combination: a frame; a drive shaft mounted for rotational movement in said frame; a plurality of transducer elements mounted to said frame in a pair of parallel planes which are substantially perpendicular to the axis of rotation of said drive shaft; a pair of disks mounted in parallel planes which are perpendicular to the axis of said drive shaft; flexible coupling means for connecting said disk to turn with said drive shaft; bearing surfaces on each of said disks; a pair of bearing surfaces on said housing, each of which faces a respective bearing surface on said disks; spring means for urging said bearing surfaces of said disks for movement relative to each other and in mutual physical rubbing engagement with respective housing bearing surfaces; and material serving as a storage medium on each of said disks in operative relation to said transducer elements.

8. A memory unit comprising: a frame; a shaft mounted for rotation relative to said frame; a disk having an outer portion of magnetizable material serving as a storage medium and an inner portion serving as a disk guiding portion with a central through aperture; means including a surface fixed with respect to said frame for cooperating with the guiding portion of said disk to guide the disk for rotation in plane; an electromagnetic head secured to the frame to be in operative relation with the magnetizable material on said disk; said shaft extending through the central aperture of said disk and having a collar with two end portions each having a diameter less than the diameter of a central portion therebetween, the diameter of central portion being substantially equal to the diameter of the central aperture in said disk to thereby control the lateral position of the disk in a plane perpendicular to the axis of disk rotation; means independent of said collar for imparting rotational torque to said disk; and means for resiliently urging the inner portion of said disk toward said surface fixed with respect to the frame.

9. The magnetic memory unit as defined in claim 8 wherein the disk guiding portion on the head plate comprises a member having a smooth, wear resistant surface; and the inner portion of said disk comprises a plurality of roller bearings mounted to said disk in spherical sockets.

10. The magnetic memory unit as defined in claim 8 wherein the disk guiding portion of said head plate comprises a member having a smooth, wear resistant hardened surface and the inner portion of said disk comprises a hard, wear resistant planar surface of a material having a self lubricating quality.

11. A disk memory unit comprising a housing; a shaft mounted for rotation in said housing; a transducer element mounted to said housing; a disk mounted in said housing for rotation relative to said transducer element; flexible coupling means connecting said disk to said shaft; said disk having a bearing surface perpendicular to and defining the angle of its axis of rotation; said bearing surface comprising a portion of the disk surface lying close to said axis of rotation; a bearing surface on said housing facing the bearing surface of said disk and being in mutual physical rubbing engagement therewith; one of said bearing surfaces being made of a hard, non-wearing, self-lubricating material; and material serving as a storage medium on another portion of the disk surface further from said axis of rotation than said bearing surface to be in operative relation with said transducer element.

12. A disk memory unit comprising a housing; a shaft mounted for rotation in said housing; a transducer element mounted to said housing; a disk mounted in said housing for rotation relative to said transducer element; flexible coupling means connecting said disk to said shaft; said disk having a bearing surface perpendicular to and defining the angle of its axis of rotation; said bearing surface comprising a portion of the disk surface lying close to said axis of rotation; a bearing surface on said housing facing the bearing surface of said disk and being in rubbing frictional contact therewith; one of said bearing surfaces made of a hard, non-wearing, self-lubricating material; and material serving as a storage medium on another portion of the disk surface further from said axis of rotation than said bearing surface to be in operative relation with said transducer element, said bearing surface and said storage medium surface on said disk being separated by a groove and said bearing surface containing a slot extending from the center of said bearing edge surface to said groove to facilitate removal of loosened particles from between said bearing surfaces.

13. In combination: a frame; a motor having an output drive shaft; a second shaft mounted for rotation on said frame coaxially with said motor shaft; flexible coupling means for connecting said second shaft to turn with said motor shaft; a disk mounted for swivel movement on said second shaft and having a bearing surface perpendicular to the axis of said second shaft; a bearing surface on said frame facing and in rubbing frictional contact with the bearing surface of said disk; one of said bearing surfaces being made of a hard, relatively non-wearing, self-lubricating material; a plurality of transducer elements mounted to said frame having active surface portions lying in a plane parallel to the plane of said bearing surfaces; and material serving as a storage medium on another portion of said disk and in operative relation to said transducer elements.

14. In combination: a frame; a motor having an output drive shaft; a second shaft mounted for rotation on said frame coaxially with said motor shaft; flexible coupling means for connecting said second shaft to turn with said motor shaft; a disk mounted for swivel movement on said second shaft and having a bearing surface perpendicular to the axis of said second shaft; a bearing surface on said frame facing the bearing surface of said disk for determining the direction of the axis of disk rotation; a plurality of transducer elements mounted to said frame having active surface portions lying in a plane parallel to the plane of the bearing surfaces; and material serving as a storage medium on another portion of said disk and in operative relation to said transducer element.

15. The combination as defined in claim 14 wherein the second shaft contains a generally cylindrical collar for laterally positioning said disk, the radius of said cylindrical collar gradually decreasing along its longitudinal axis from a maximum at the center to a smaller radius at either end to provide said swivel movement, and the portion of said collar having maximum diameter coinciding with the approximate center of said disk.

16. The combination as defined in claim 14 wherein the side of the disk having the bearing surface has a further surface coplanar with the bearing surface, having a coating containing magnetizable particles, and the spacing between the plane containing the active surface portions of said transducer elements being parallel to and nominally 0.001 inch from the surface of said coating.

17. In a disk type memory unit: a frame; a motor having an output shaft mounted to said frame; a housing mounted to said frame comprising a head mounting plate and an end bell fastened together at their peripheries to provide a hollow interior cavity and each having axially aligned bores; bearing means in each of said bores; a shaft journalled at one end in the bearing in said head mounting plate and at the other end in the bearing in said end bell and coupled to the output shaft of said motor by a flexible coupling unit; a tapered collar on said shaft centrally of said bearings; a disk having a central bore of uniform diameter substantially equal to the maximum diameter of said collar mounted on said collar for swivel fovement relative to said head plate shaft; thrust bearing means for determining precisely angular position of the axis of rotation of said disk comprising a thrust bearing member secured to said head mounting plate having a flat, hard wear-resistant surface facing said disk and means on said disk facing said thrust bearing member surface for providing a low friction bearing; flexible coupling means connected from said shaft for transmitting shaft rotation torque to said disk including a plurality of disk like elements, at least one of which is made of resilient material, mounted together in a face-to-face relationship and one of said elements being engaged with a surface of said disk; and a compression spring mounted between said shaft extension member and one of said disk like elements of the flexible coupling means to rotate with said shaft extension member and to urge said flexible coupling means against said disk and the disk against the thrust bearing member surface.

18. In a disk type memory unit: a frame, a motor having an output shaft mounted to said frame; a housing mounted to said frame comprising a head mounting plate and an end bell fastened together at their peripheries to provide a hollow interior cavity and each having axially aligned bores; bearing means in each of said bores; a shaft extension member journalled in the bearing in said end bell and secured at one end to the motor output shaft; a head plate shaft journalled in the bearing in said head mounting plate and having one end portion extending into the housing cavity; a tapered collar on said one portion having its maximum diameter centrally of its ends; a disk having a central bore of uniform diameter substantially equal to the maximum diameter of said collar mounted on said collar for swivel movement relative to said head plate shaft; thrust bearing means for determining precisely angular position of the axis of rotation of said disk comprising a thrust bearing member secured to said head mounting plate having a flat, hard wear-resistant surface facing said disk and means on said disk facing said thrust bearing member surface for providing a low friction bearing; flexible coupling means connected from said shaft extension means for transmitting shaft rotation torque to said disk and to said head plate shaft including a plurality of disk like element, at least one of which is made of resilient material, mounted together in a face-to-face relationship and one of said elements being engaged with a surface of said disk; and a compression spring mounted between said shaft extension member and one of said disk like elements of the flexible coupling means to rotate with said shaft extension member and to urge said flexible coupling means against said disk and the disk against the thrust bearing member surface.

19. In a magnetic disk memory unit, a fixed frame member having a plane surface; an electro-magnetic transducing element mounted to said frame member; a disk mounted adjacent said plane surface for rotational movement relative to said frame member and having a magnetic storage medium along a surface portion in operative position with said transducing element; and flexible coupling means for rotating said disk about an axis and resiliently holding said disk against said plane surface in mutual physical rubbing engagement and providing a uniform spacing between said transducing element and said magnetic storage medium.

20. The disk memory unit as defined in claim 19 further having a bore in said fixed frame member, the axis of said bore being substantially normal to the plane surface on said frame member, and means mounted in the bore of said frame member for determining the lateral position of the disk in a plane perpendicular to the axis of disk rotation.

References Cited in the file of this patent

UNITED STATES PATENTS

| | | |
|---|---|---|
| 2,750,579 | Lekas et al. | June 12, 1956 |
| 2,899,260 | Farrand et al. | Aug. 11, 1959 |
| 2,908,541 | Fomenko | Oct. 13, 1959 |
| 2,950,353 | Fomenko | Aug. 23, 1960 |

UNITED STATES PATENT OFFICE

CERTIFICATE OF CORRECTION

Patent No. 3,135,949 June 2, 1964

Gordon J. Whyte

It is hereby certified that error appears in the above numbered patent requiring correction and that the said Letters Patent should read as corrected below.

Column 4, line 70, after "Instead" insert -- of graphite as being the one of the self-lubricating --; column 8, line 39, after "208" insert -- and --; column 9, line 74, after "physical" insert -- rubbing --; column 11, line 72, after "surfaces" insert -- being --; column 12, line 64, for "fovement" read -- movement --; column 13, line 31, for "element" read -- elements --.

Signed and sealed this 27th day of October 1964.

SEAL)
ttest:

RNEST W. SWIDER
testing Officer

EDWARD J. BRENNER
Commissioner of Patents